No. 744,031. PATENTED NOV. 17, 1903.
W. B. BROOKFIELD.
PROCESS OF MANUFACTURING STEEL.
APPLICATION FILED JAN. 14, 1903.
NO MODEL.

WITNESSES:
Chas. J. Foner.
Chas. Young

INVENTOR
William Bertin Brookfield.
BY
Hey & Parsons
ATTORNEYS

No. 744,031.

Patented November 17, 1903.

UNITED STATES PATENT OFFICE.

WILLIAM BERTIN BROOKFIELD, OF SYRACUSE, NEW YORK.

PROCESS OF MANUFACTURING STEEL.

SPECIFICATION forming part of Letters Patent No. 744,031, dated November 17, 1903.

Application filed January 14, 1903. Serial No. 139,008. (No specimens.)

*To all whom it may concern:*

Be it known that I, WILLIAM BERTIN BROOKFIELD, of Syracuse, in the county of Onondaga and State of New York, have invented a certain new and useful Process of Manufacturing Steel, of which the following is a specification.

This invention has for its object a process of producing steel known commercially as "crucible-steel," which is particularly practical and causes the product to be especially uniform in hardness and character; and to this end the invention consists in the manner of treatment hereinafter specifically pointed out and claimed.

In describing this invention reference is had to the accompanying drawings, in which like characters refer to corresponding parts in all the views.

Figure 1:
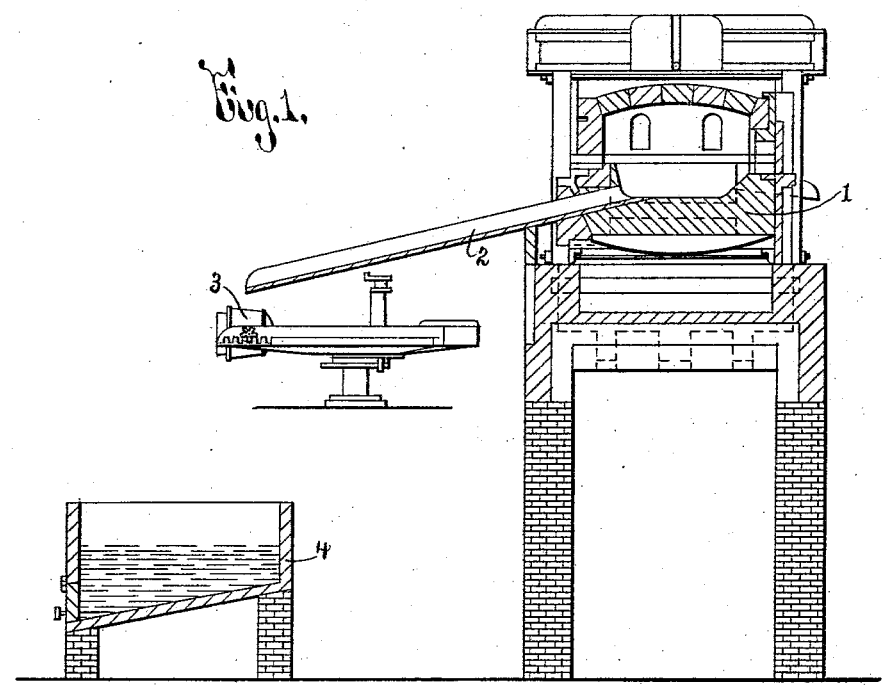
Figure 3:
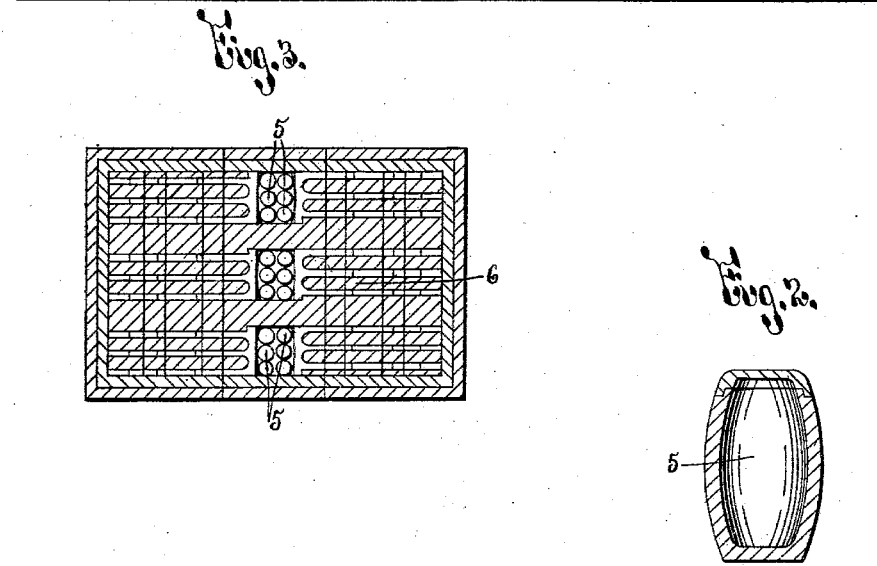
Figure 2:
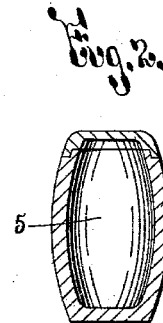

Figure 1 is a sectional view, partly in elevation, of the greater portion of one form of apparatus for carrying out my process. Figs. 2 and 3 are sectional views, respectively, of one of the crucibles and a crucible-furnace forming part of said apparatus.

Crucible-steel, and particularly "self-hardening" steel, is produced in a plurality of crucibles of relatively small capacity, for the reason that it has not heretofore been possible to manufacture this steel in bulk, owing to the mechanical difficulties experienced in forming the same into finished bars and plates. In the commercial manufacture of such steel the component ingredients are inserted into the respective crucibles and are subsequently fused, and the fused mixtures are cast into ingots, which are rolled or otherwise manipulated for forming finished bars or plates. Owing to the insertion of the ingredients composing the steel into a number of different crucibles of relatively small capacity, there is obviously more or less variation in the character of the steel produced from the mixtures fused in the respective crucibles. One of the ingredients inserted into the crucibles for forming steel in this manner is ferrochromium, in which the amount of chromium, by weight, is largely in excess of the amount of iron, and, as is obvious to those skilled in the art, the chromium raises the fusing-point of the mixtures, does not readily and uniformly unite with the iron, and unites to a greater or less extent with the carbon of the crucibles or melting-pots, thus materially lessening the lifetime of the crucibles. Moreover, the chromium is more readily oxidized than the iron, and during the handling of the fused mixtures in the formation of ingots the oxidation of the chromium produces imperfections in the ingots, which result in flaws in the finished bars or plates, causing the same to present a "seamy" appearance and detracting from the salability and utility thereof.

By my invention crucible-steel, and particularly self-hardening steel, is produced in a novel manner, as follows: Iron, chromium, and molybdenum are melted together in bulk in a suitable furnace, as an "open-hearth" furnace 1, Fig. 1, and are thus refined, mixed, and united to a maximum degree. I usually first fuse the iron in the furnace 1 and then add the chromium and molybdenum and subject the entire mass to heat in said furnace until the metals are thoroughly mixed together. The iron, chromium, and molybdenum mixture is reduced to a subdivided or fragmentary condition in any desired manner. In the illustrated apparatus for carrying out my process said mixture is conducted from the furnace 1 through a trough 2 into a ladle 3 and while molten is dropped from said ladle into a body of water or other liquid in a receptacle 4, whereupon the compound readily separates into substantially spherical bodies of relatively small size, which are quickly cooled in the water, are uniform in hardness and character, and are easily handled and fused. It will be understood that the furnace 1 or the trough 2 is provided with suitable means for controlling or preventing the flow of the molten metal from the furnace through the trough. Said broken up or subdivided iron, chromium, and molybdenum compound is then filled into crucibles 5 and fused in a crucible-furnace 6 and when fused or melted is cast into ingots, which are subsequently rolled or otherwise manipulated for forming finished bars or plates.

In following out this process I preferably use the iron, chromium, and molybdenum in the following proportions, by weight: iron, ninety-four to seventy parts; chromium, one to fifteen parts; molybdenum, five to fifteen parts.

The length of time during which the iron, chromium, and molybdenum are heated in the furnace may be from one to twelve hours, and the length of time during which the fragmentary product is heated in the crucibles may be from one to six hours.

To those skilled in the art it will be understood that the proportions of iron, chromium, and molybdenum and the length of time during which the same are subjected to heat are dependent, more or less, upon the grade of the materials and that a small amount of silicon, usually less than two per cent., is present in the final product. It will also be understood that instead of iron a good grade of soft steel may be used.

It will be particularly noted that by producing steel as described the materials are refined by the fusing and heating in the open-hearth furnace and are thoroughly mixed even though the steel is low in carbon, that the uniting of the iron with the chromium in the open-hearth furnace reduces to a minimum the liability of the combination of the chromium with the carbon of the crucibles and the resultant disintegration and destruction of the crucibles, and that the entire process greatly facilitates the production of a finished product of maximum uniformity in hardness and character and the manufacture of finished bars or plates which are free from defects, as seams, &c.

Having thus fully described my invention, what I claim as new, and desire to secure by Letters Patent, is—

1. The herein-described process of producing steel, the same consisting in fusing iron, chromium and molybdenum in bulk together, reducing the resultant product to a subdivided or fragmentary condition, and then fusing said reduced product in crucibles, substantially as and for the purpose described.

2. The herein-described process of producing steel, the same consisting in fusing from ninety-four to seventy parts by weight of iron with from one to fifteen parts of chromium and from five to fifteen parts of molybdenum in bulk together, reducing the resultant product to a subdivided or fragmentary condition, and then fusing said reduced product in crucibles, substantially as and for the purpose described.

In testimony whereof I have hereunto signed my name, in the presence of two attesting witnesses, at Syracuse, in the county of Onondaga, in the State of New York, this 10th day of January, 1903.

WILLIAM BERTIN BROOKFIELD.

Witnesses:
S. DAVIS,
D. LAVINE.